Etienne Boileau and Charles Mesnier,
Hinge.
N° 92,150.  Patented July 6 1869.
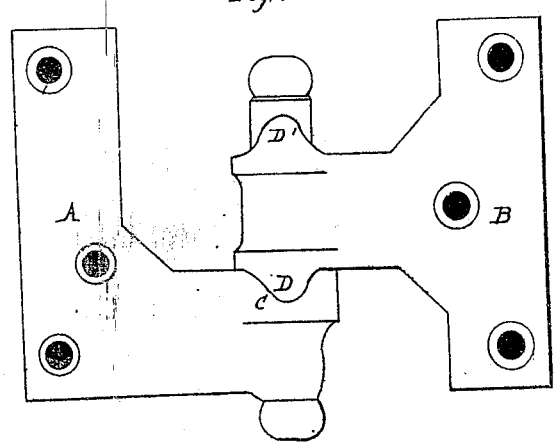
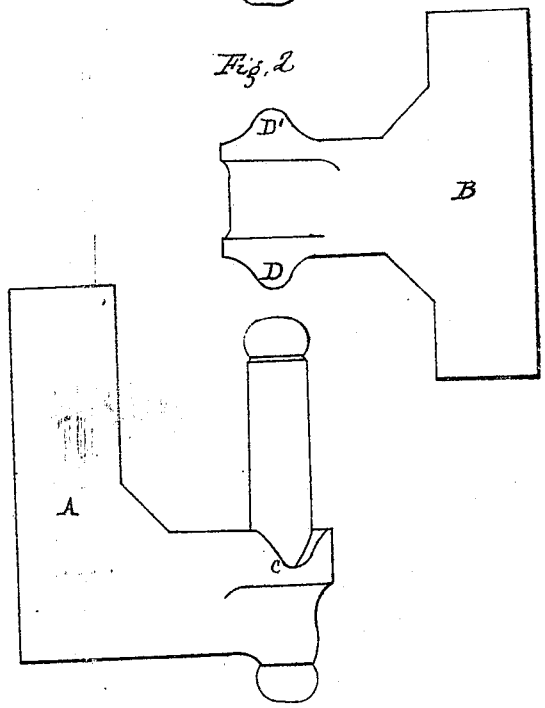
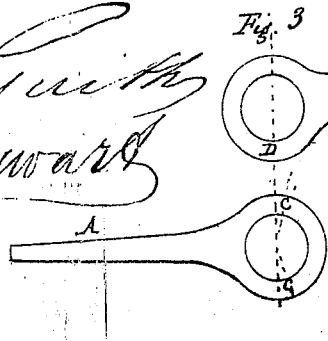
Witnesses
Pierre Guith
Joseph Tilyward
Inventor
E. Boileau
Charles Mesn.

UNITED STATES PATENT OFFICE.

ETIENNE BOILEAU AND CHARLES MESNIER, OF ST. LOUIS, MISSOURI.

IMPROVED HINGE.

Specification forming part of Letters Patent No. 92,150, dated July 6, 1869.

*To all whom it may concern:*

Be it known that we, ETIENNE BOILEAU and CHARLES MESNIER, both of St. Louis, in the county of St. Louis, in the State of Missouri, have invented a new and Improved Shutter-Hinge; and we do hereby declare that the following is a full and exact description thereof, reference being had to the accompanying drawings, and to the letters of reference marked thereon.

The nature of our improvement consists in having the hinge, which is made in two parts, A and B, arranged with double reversible locking-flanges, as shown.

The lower part, A, bears the pivot, and is made to be used right or left, and provided with two notches, C C', Figs. 1, 2, and 3.

The upper part, B, is provided with two cams, D D', and made so that by reversing it can also be used right or left.

We are aware that hinges have been made with the double-locking device, and also with a reversible arm. This we do not claim; but What we do claim as our improvement in shutter-hinges, and desire to secure by Letters Patent, is—

The combination of the notches C C' with the cams D D', Fig. 3, so arranged that by reversing the upper part, B, the hinge may be used either right or left, and the shutter fastened both open and closed, all as shown and described.

E. BOILEAU.
CHARLES MESNIER.

Witnesses:
PIERRE GUILLY,
JOSEPH SIEGWART.